United States Patent [19]

Kurywczak

[11] Patent Number: 4,744,268
[45] Date of Patent: May 17, 1988

[54] EPICYCLE POWER AMPLIFIER

[76] Inventor: Eugene Kurywczak, 238 Murray St., Elizabeth, N.J. 07202

[21] Appl. No.: 925,098

[22] Filed: Oct. 30, 1986

[51] Int. Cl.[4] ............................................. F16H 3/44
[52] U.S. Cl. .................................... 74/781 R; 74/785
[58] Field of Search .................. 74/781 R, 785, 752 F, 74/773, 750 R

[56] References Cited

U.S. PATENT DOCUMENTS

| | | | |
|---|---|---|---|
| 1,785,338 | 12/1930 | Coleman | 74/773 |
| 2,012,377 | 8/1935 | Normanville | 74/781 R |
| 2,177,872 | 10/1939 | Dunn | 74/781 R |
| 2,209,120 | 7/1940 | Hoffman | 74/785 |
| 2,248,240 | 7/1941 | King | 74/773 |
| 2,388,455 | 11/1945 | White | 74/781 R |
| 2,851,907 | 9/1958 | Normanville | 74/781 R |
| 3,154,964 | 11/1964 | Lewis | 74/785 |
| 3,838,610 | 10/1974 | Fogelberg | 74/773 X |

Primary Examiner—Leslie A. Braun
Assistant Examiner—David Novais

[57] ABSTRACT

A planetary system suitable for amplification of horse power by a single or multi-stage arrangement from a rotary power source. In a stage provided are three axially concentric elements, whose axes define the system axis, a braked reaction gear and two non gear elements that rotate at the same angular speed, the input carrier and the output lever. Driven by and on the carrier is an iso-planet whose gear element meshes with the reaction gear and whose non-gear element, a free floating rim isolated from the rotation of the gear around its center and carried around the system axis is adapted to mate with and drive the output lever in specifically selected position on the system radius that is radially perpendicular to a point of large tangential force of the torque on the momentary driven radius of the iso-planet gear element. Output lever driven by a large force renders a larger torque and therefore power than the power applied. Also, the iso-planet with the output lever are applicable in today's designs of inverted and non-inverted planetary systems that have, input into a sun gear or ring gear and the output is the carrier. Idling the carrier and utilizing the output lever mated with an iso-planet of original size gear element will render, an angular output speed of the predetermined reduction ratio and an output torque larger than predetermined by the reduction ratio, therefore an input to output power ratio, larger than one to one.

7 Claims, 2 Drawing Sheets

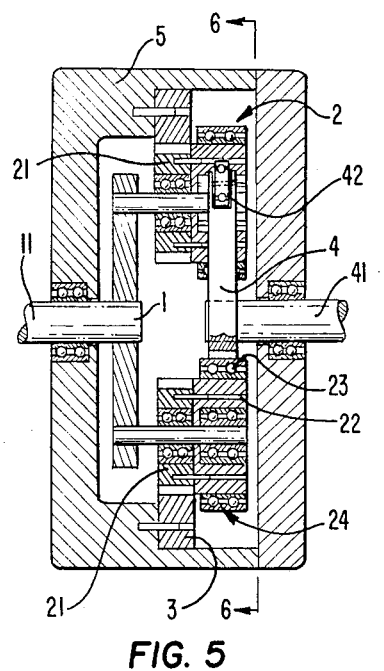
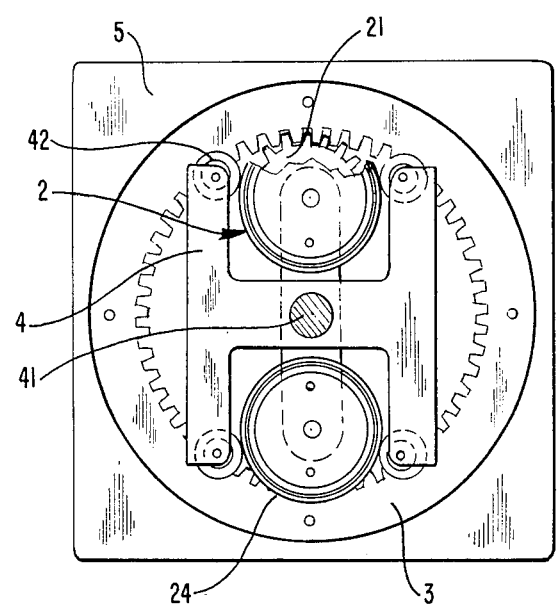
FIG. 5　　　　　FIG. 6
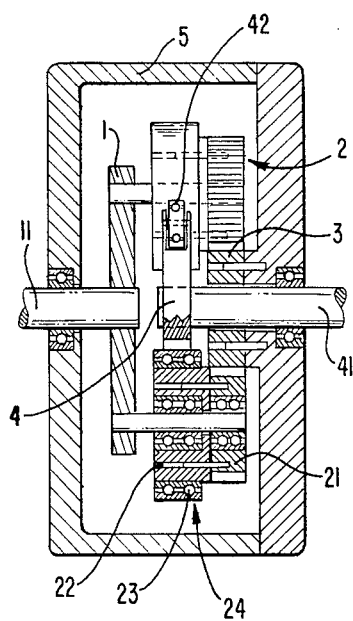
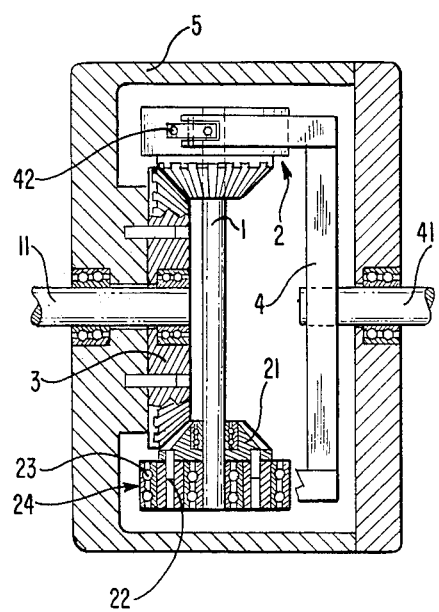
FIG. 7　　　　　FIG. 8

EPICYCLE POWER AMPLIFIER

The intent of this invention is to amplify torque of a rotary power source without changing the angular speed of that source. Also to utilize, as a modification in the state-of-the-art planetary systems, which will upgrade same, to planetary power amplifiers at their pre-designed speed reductions.

In summary, the Epicycle Power Amplifier is a three lever system. An input carrier lever on which, an iso-planet as a class two lever, is rotatably mounted and rolled around a braked reaction gear, driving the third, output lever, through an isolated rim of an angular rotation isolation system, transmitting to the output lever only the tangential acceleration of the rolling part of the iso-planet. The torque is amplified in ratio between the momentary driving radius on the rolling portion of the iso-planet and the driven radius of the output lever, where the driving force on the iso-planets driving radius applied to the output lever is the quotion of the torque across the driven radius in lb. inch/driving radius in inch and renders torque in lb. inches out, force in lb.×radius in inches of the output lever.

In planetary systems of the old art the emphasis is, speed reduction with proportional torque amplification. The planet is driven either at the rim or at the center and the output of the output moment arm is also either the rim or the center, except in epi or hypocycloidal systems. Which states, that no other point on the planet can be used to produce pure circular translation on the system radius to drive an output device around the system axis. Where from the point of view of the development of torque in the planetary systems, the torque is developed across the momentary input moment arm from the braked reaction member, where the driving force at the output moment arm is proportional to the size of its radius also from the reaction member, which provides a large force nearer to the fulcrum point of the moment in accord with the law of mechanical advantage of the lever and separated from the system axis by the radius of the reaction member. This also makes a statement, that at any instant of time on the planet, at a radius that is a fraction of the driven radius of the moment of the planet, a proportional large force, T/R, is available to drive an output lever that is perpendicular to that force from the system axis, thus increase torque. Only a method comparable to present day methods, other than the center or rim, is required to utilize that force, in a continuity throughout the planets orbit. Solution to this problem is the object of petition for a patent to be granted where in the description that follows he will present a system, in which any point on the driven moment arm on the planet can be utilized as a driving moment arm. References, for similarity, none have been found.

For workability, the basic law of the lever and torque, as applied to the planet on the braked reaction member in the simple present day planetary systems is called on, as supporting fact that the system works as described.

The drawings illustrate the detail of only one method that conveys the principles of the invention.

FIGS. 5 and 6 show a braked ring gear system in two views detailing mounting of iso-planet below line A and position of contact of output lever with the iso-planet above line A.

FIG. 7 side view of a system with braked sun gear.

FIG. 8 same as FIG. 7 except showing bevel gears system.

DESCRIPTION

Figure 1:
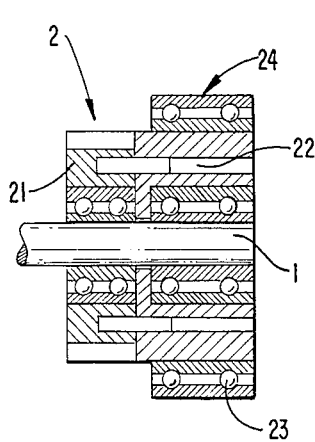
FIGS. 1 and 2 show two views of the iso-planet, detailing the individual components.
Figure 2:
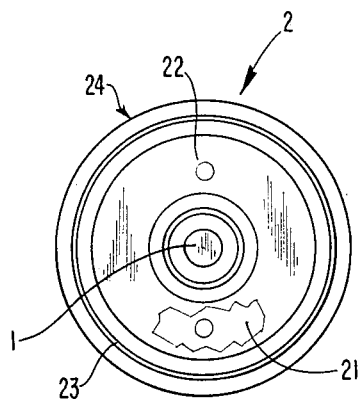
Figure 3:
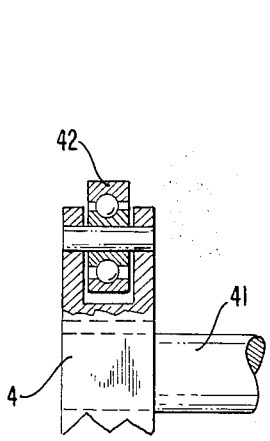
FIGS. 3 and 4 show two views of the rollers on the output lever.
Figure 4:
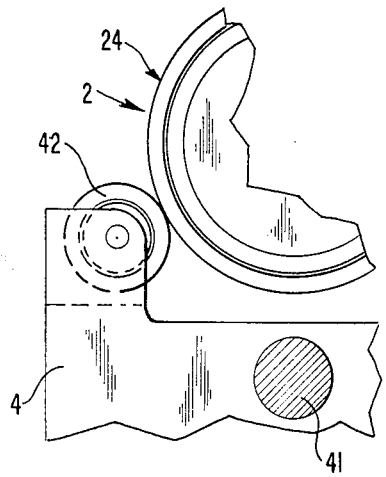

The essence of this invention is provision of a positive linear drive to an output lever from a rolling planet by isolating the angular rotation of the planet from that output lever. Provision for the positive drive to be, any point on the planets driven radius. Provision to select the driving point on the planet is that, at which the driving force applied the output lever renders an output torque larger than the input torque.

Where in the drawings, see FIGS. 5 and 6, in housing 5 providing means to mount: a braked ring gear 3 is centrally positioned. Concentric to the axis of the ring gear, an output shaft 41 rigidly affixed to the output lever 4 is rotatably mounted, opposite and concentric to the output shaft 41, an input shaft 11 rigidly affixed to carrier 1 is rotatably mounted, both, input shaft 11 and output shaft 41 pass through the housing on their respective sides for connection with the power means and the load. On carrier 1 providing the means, see FIGS. 1, 2, 5 and 6, an iso-planet 2 is rotatably mounted, comprising a planet gear 21 that meshes with ring gear 3, hub 22 bonded to gear 21, a bearing 23 pressed on to hub 22 and having a floating rim 24 that is isolated from the rotation around the center of the planet gear 21 and the bonded rim of bearing 23 by the frictionless agent (rollers or equivalent) between them, on the output lever 4 providing the means, two rollers 42, see FIGS. 3, 4, 5 and 6, are mounted on both sides of the iso-planet 2, making contact with rim 24 at a pre-selected position that is perpendicular to the selected force point at the output moment arm of planet gear 21 and provide further isolation from the angular rotation of planet gear 21. See FIGS. 5 and 6. That when power is applied to input shaft 11, rotating carrier 1, the iso-planet 2 will roll one time around the reaction gear 3 for one revolution of carrier 1 and push the output lever 4 one revolution with a force of a weight at the point of contact at the isolated rim 24 with the roller 42 equal to the weight of the force of the moment around the axis of the moment on the reaction gear 3, selected to be the perpendicular action point of the output moment arm on the input moment arm of the planet gear 21 and of magnitude determined by ratio of their radii sizes. Where in a system that the point of contact is selected to be 0.5 inches from the teeth of the reaction gear 3 and the input carrier radius in 2.0 inches.

Planet gear 21 driven radius is 1.0 inch.

Planet gear 21 driving radius is 0.5 inches, then the output lever 4 driven radius is 2.5 inches and ring gear 3 radius is 3.0 inches and a 2 lb. inch torque across the carrier 1 radius, applies a 1 lb. force to the driven radius of planet gear 21, then at 0.5 inch from the braked ring gear on planet gear 21 a force of, 1 lb. inch/0.5 inch=2 lb., is applied to the output lever 4, rendering an output torque of 2 lb.×2.5 inch=5 lb. inch. A gain of 2.5 in respect to the input torque. Since power is:

T (lb. inch)×RPM/63025 or F (lb.)×FPM/33000, power output is equally amplified. The foregoing also applies to systems shown in FIGS. 7 and 8.

From the drawings and the description it is evident to a person skilled in the art, that it is very simple to incorporate the iso-planet 2 and the output lever 4 into present day designs of the planetary systems, by modifying his/her design to utilize the iso-planet 2 with the output lever 4. And, due to the great variety of systems, specific descriptions are not desired and therefore not illustrated.

The foregoing is considered as illustrative only of the principals of the invention. Many changes in the isolation method of planets angular rotation, construction and operation shown will readily occur to those skilled in the art, it is not desired to limit the invention described, as the only means, all suitable modifications and equivalents may be resorted to, falling within the scope of the invention.

Further, the claim of power amplification implies the Epicycle Power Amplifier to be in conflict with the First Law of Thermodynamics. This is not true. Because the Newtons Laws of Motion prove that acceleration of a body takes place only when a force acts on the body. The description of the system points out, all the forces from their axes acting on the iso-planet and its separation from the system axis. Thus describing a system of potential energy. Where the input power develops a driving force on the iso-planet in a radially accelerated position proportional to its separation from the system axis, which drives the output lever and when taken into account, proves in accordance with Newton's Laws, that the system is in compliance with the First Law of Thermodynamics.

What I claim is:

1. An Epicycle Power Amplifier comprising a housing and means within the said housing to mount: a centrally positioned braked reaction gear, concentric to an axis of the said reaction gear, a rotatable input shaft with a rigidly affixed carrier lever, extending outside the said housing and providing means of connection with a rotating power means, opposite and concentric to the said input shaft, a rotatable output shaft with a rigidly affixed output lever, extending outside the said housing and providing means of connection with a load, on the said carrier providing means in a position at a distance from its axis, a rotatable iso-planet is mounted, comprising a planet gear meshing with the said reaction gear, a hub that is one piece construction with the said planet gear, a bearing fitted onto the said hub and having a free floating rim, isolated by a frictionless agent comprising a bearing that provides isolation of an angular rotation of the said planet gear around its axle from the said free floating rim, on the said output lever in a position separated by a distance from its axle, rollers, making contact connection on both sides with the said free floating rim of the said iso-planet and perpendicular to an orbital translation thereof.

2. Power amplifier as claimed in claim 1, wherein the said free floating rim of the said iso-planet provides the means for the said contact with the said rollers on the said output lever, radially perpendicular with any point on the a diameter of the said iso-planet gear.

3. Power Amplifier as claimed in claim 1, wherein the said free floating rim, is a non rotating driving means, that by contact with the said rollers, which provide further isolation of the said angular rotation of the said planet gear from the said output lever, push the said output lever around its axis.

4. A power amplifier as claimed in claim 1, wherein an angular output speed of the said output lever is proportional to a translational orbital speed of the said iso-planet around the said reaction gear, radially separated from a system axis, that is defined by the said input and output shafts axes.

5. Power amplifier as claimed in claim 1, wherein power output is amplified with respect to the applied power by virtue of amplification of torque across a driven radius of the said output lever of angular velocity equal to an angular velocity of the said input carrier, to a magnitude larger than an magnitude of an input torque applied by the said carrier to a momentary driven radius of the said iso-planet, the size of the driven radius of said iso-planet being from its center to a momentary axis on the said reaction gear in a radially accelerated position on a system radius, separated from a system axis by a radius of the said reaction gear, where at, specifically, in the said radially accelerated position, at a specific point, a specific distance from the said reaction gear, that is radially perpendicular to a point equal to said specific distance on the said momentary driven radius of the iso-planet and predetermined to be a fraction thereof, a mating of the said output lever with the said free floating isolated rim is instituted and is in physical contact with the said point of specific distance on the said driven radius of the iso-planet, thus defining by this said distance from the reaction gear to the point of the said mating, the size of a driving radius of the said iso-planet and its magnitude of a tangential force of the moment in ratio to the torque across the driven radius of the iso-planet and by the distance to the system axis, the size of the driven radius of the said output lever across which, by the product of the said size and the large tangential force of the moment at the said driving radius of the iso-planet the large magnitude of the said output torque and therefore output power is defined, wherefore the said output power is equal to a tangential power at the said mating point which is a sum of powers comprising said input power, rolling the said iso-planet gear over the said reaction gear around the said system axis and rendering the said large tangential force, plus a power of position of the radial force of the system radius accelerating the said large tangential force according to its separation from the said system axis.

6. Power amplifier as claimed in claim 5, wherein the said iso-planet is a modified planet gear by addition of an isolation system, isolating its angular rotation around its center from its said free floating rim, mated with the said output lever at the said specific point on the system radius are applicable as modification of design of inverted and non-inverted planetary speed reduction systems having the carrier as an output element, a braked reaction gear and an input element being either a sun gear or a ring gear, comprising, idling the said carrier and substituting the planet gear and the output element in the said systems with the said iso-planet and output lever respectively, whereupon the said systems of modified design will render speeds predetermined by their particular speed reduction ratio and torque larger than defined by the said predetermined speed reduction ratio, thus rendering a power output to input ratio larger than one to one.

7. A power amplifier as claimed in claim 1, wherein the braked reaction gear is a sun gear.

* * * * *